Nov. 18, 1924.

A. C. ERICKSON

BIRD HOUSE

Filed April 13, 1921

Inventor
A. C. Erickson
By A. Milton Buck
Attorney

Nov. 18, 1924.  
A. C. ERICKSON  
BIRD HOUSE  
Filed April 13, 1921  
1,516,381  
2 Sheets-Sheet 2
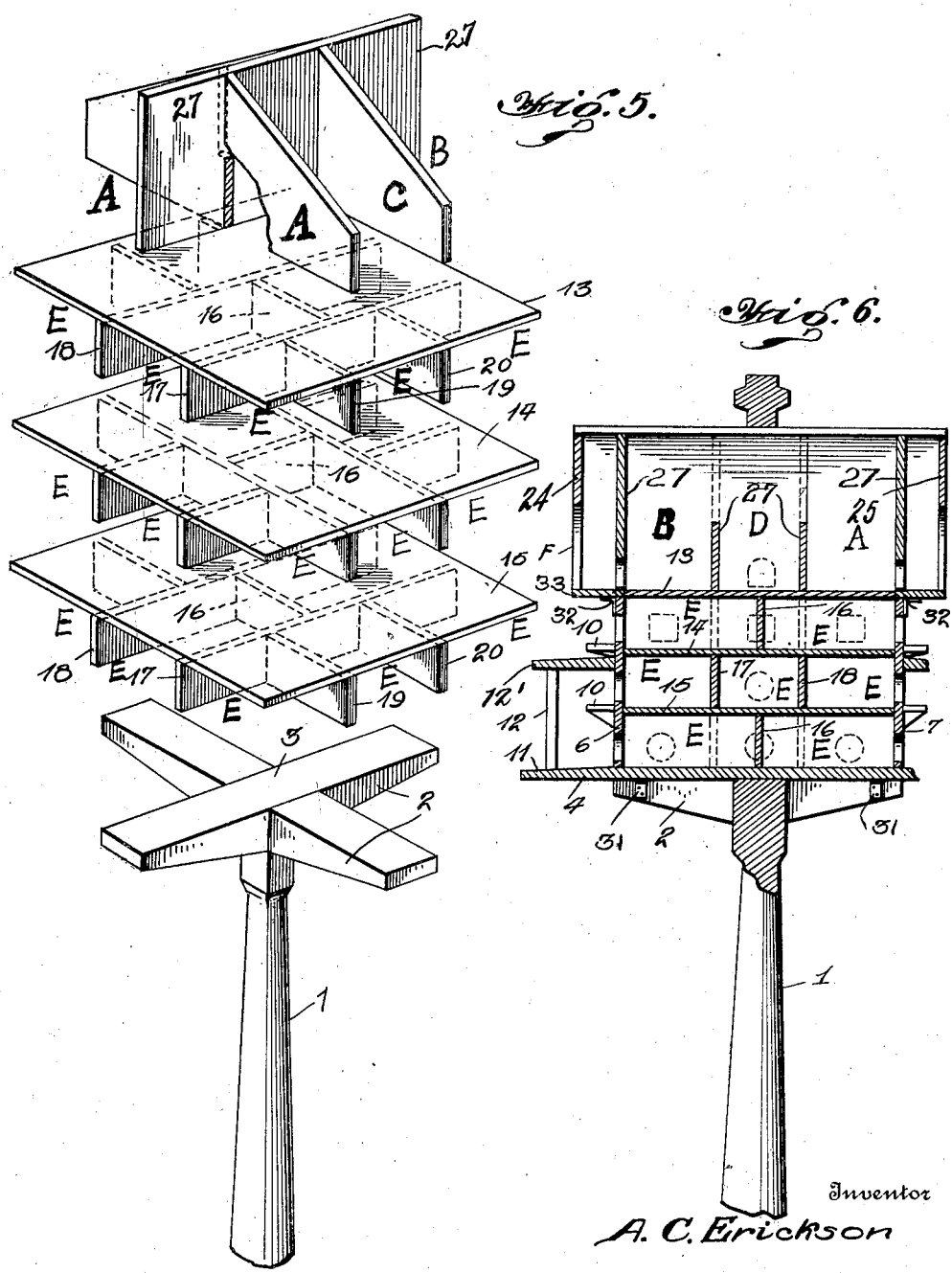

Patented Nov. 18, 1924.

1,516,381

UNITED STATES PATENT OFFICE.

ALFRED C. ERICKSON, OF HARBOR SPRINGS, MICHIGAN.

BIRD HOUSE.

Application filed April 13, 1921. Serial No. 461,002.

*To all whom it may concern:*

Be it known that I, ALFRED C. ERICKSON, a citizen of the United States, residing at Harbor Springs, in the county of Emmet and State of Michigan, have invented certain new and useful Improvements in a Bird House, of which the following is a specification.

This invention has relation to certain new and useful improvements in bird houses, the primary object being to provide an attractive, cleanable bird house especially adapted to house English martins, though other birds can of course nest and home in the same.

It is also within the scope of this invention to provide a house, noticeable because of its simplicity, and ready adaptability to be cleaned.

In addition to the foregoing, this invention comprehends improvements in the details of construction and arrangement of parts, to be hereinafter described and particularly pointed out in the appended claim.

In the accompanying drawings, in which similar and corresponding parts are designated by the same characters of reference, throughout the several views in which they appear:

Figure 5 is a view showing the partitions in perspective.

Figure 6 is a vertical section through the house.

In carrying out the object of my invention, I employ a post 1, to the upper end of which I fix a cruciform shaped support 2, including the flat upper surface 3, upon which the base or bottom 4 rests which has its surface sloping downward insuring the water draining off.

Figure 1:
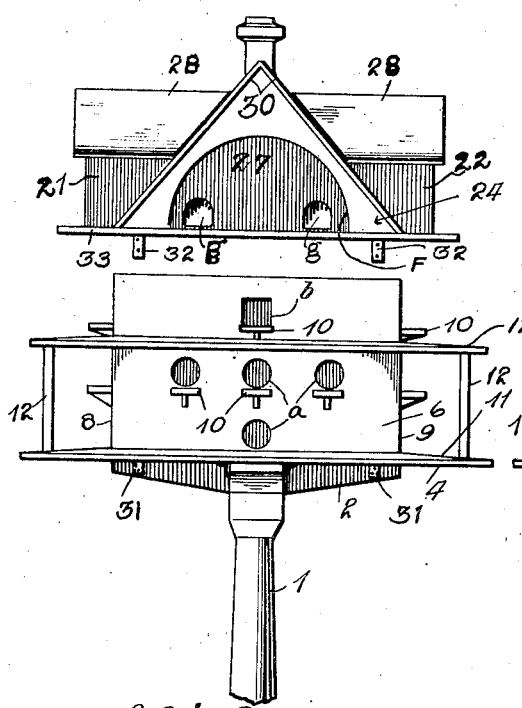
Figure 1 is an elevational view of the house with the roof raised.
Figure 2:
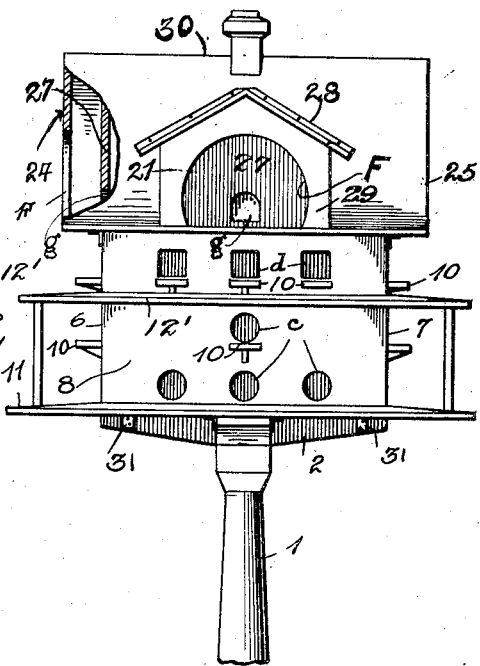
Figure 2 is an elevational view disclosing the house complete, a portion of the roof being broken away.
Figure 3:
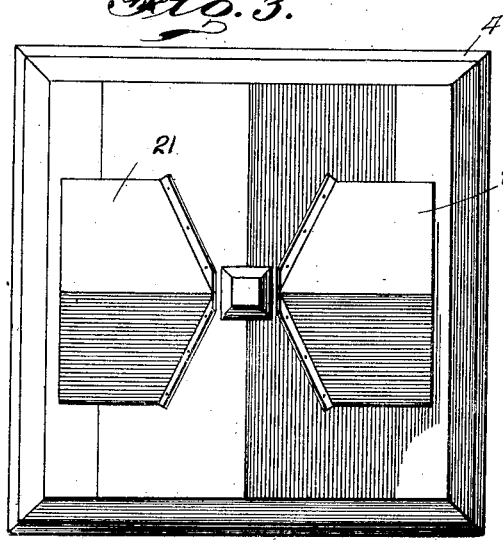
Figure 3 is a top view.

Fixed to the bottom 4 is the house including the ends 6 and 7 and the sides 8 and 9, the ends having the door openings (*a*) which are circular, and the centrally positioned square door openings (*b*) while the sides have the round openings (*c*) and the square openings (*d*) as shown in Figures 1 and 2.

Fixed to the housing are the perches 10 one being fixed below each door opening (*a*), (*b*), (*c*) and (*d*) while surrounding the house is the four sided perch 11, supporting at each corner a post 12, the posts in turn supporting a roof 12'.

As shown the sides 8, 9, ends 6 and 7, and the perch 11 are all fixed to the base or bottom 4, as best shown in Figure 1, while removably held in the house are the three bottoms 13, 14 and 15. These bottoms are each supported on a set of connected partitions including the central partitions 16 and the two parallel extending partitions 17, 18 and the two outer stub partitions 19 and 20. These partitions are arranged to snugly but removably fit into the house in the manner shown in Figures 5 and 6.

Figure 4:
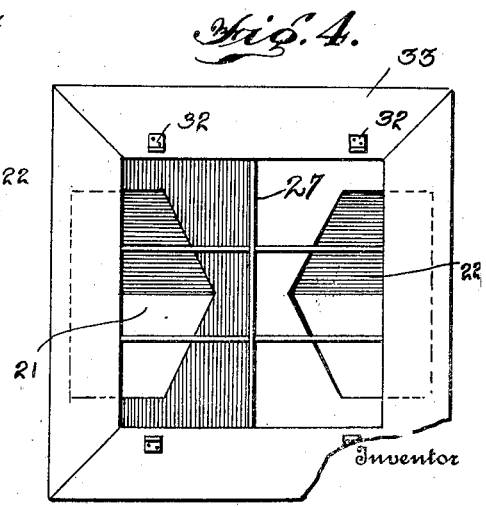
Figure 4 is a bottom view of the roof.

Held to the house is the roof including the two gables 21 and 22, and the two side gables 24 and 25, the walls of the gables in connection with the walls 27 shown in Figures 2, 4 and 6 forming compartments, which are entered through the openings (F), shown in Figure 2. The gables 21 and 22 are each provided with the openings (*g*). The stub roof sections 30 are held on the members 27.

As shown in Figure 4, I employ an open rectangular outer skirting base section 33 which extends around the upper edges of the walls of the house. The gables 21, 22, 24 and 25 rest on this outer skirting base section as do also the walls 27.

Held on the members 21 and 22 are the roof sections 28 which at their outer edges are reenforced by means of the end members 29. As will be understood in referring to Figure 5, the roof has four end compartments A A and B B and two side compartments C and D while the three lower sections are each provided with eight compartments E.

In order to hold the base 4 to its support, I employ the angle irons 31, each having one of its ends fixed to the underface of the base 4, the other end being fixed to the head 1, while the roof is held to the house by the angle irons 32, each iron being held to its members 33, and 6 and 7 by means of suitable screws.

The great advantage of a bird-house constructed according to my invention lies in the ability to readily clean the house in removing the old nests, which can be done with ease, accuracy and despatch in simply removing the screws holding the roof, on removing which the partitions and bottoms can be readily lifted out permitting the removal of the old nests.

While I have illustrated and described my invention with some degree of particularity, I realize that in practice various alterations therein may be made. I therefore reserve the right and privilege of changing the form of the details of construction or otherwise altering the arrangement of the correlated parts, without departing from the spirit of the invention or the scope of the appended claim.

Having thus described my invention, what I claim as new and desire to secure by United States Letters Patent is:

A bird house comprising a support, a bottom mounted thereon, upstanding walls supported upon the bottom and defining an enclosure, the said walls having entrance openings communicating with the interior of the enclosure, the marginal portions of the bottom projecting beyond the outer sides of the walls whereby to provide a perch extending about the exterior of the enclosure, a plurality of floor members arranged one above another within the enclosure, partitions extending between adjacent ones of the floor members and interiorly dividing the enclosure, the floor members and associated partitions being independently removable through the top of the enclosure, and a roof structure removably secured in place upon said top and closing the same.

In testimony whereof, I affix my signature.

ALFRED C. ERICKSON.